United States Patent [19]

Kabatepe

[11] Patent Number: 5,590,131
[45] Date of Patent: Dec. 31, 1996

[54] EFFICIENT DISTRIBUTED QUEUEING RANDOM ACCESS METHOD FOR THE MEDIUM ACCESS CONTROL LAYER IN NETWORKS WITH BROADCAST CHANNELS

[75] Inventor: Mete Kabatepe, Norwood, Mass.

[73] Assignee: Motorola, Inc., Schaumburg, Ill.

[21] Appl. No.: 453,854

[22] Filed: May 30, 1995

[51] Int. Cl.[6] .................................................. H04T 3/02
[52] U.S. Cl. .................. 370/461; 370/477; 360/825.5
[58] Field of Search .......................... 370/17, 85.1, 85.2, 370/85.3, 85.8, 93, 85.6, 96.1, 118, 13, 15, 19, 82, 85.7, 95.1, 95.2, 95.3; 348/8; 455/3.1; 340/825.5, 825.51, 825.06, 825.08, 825.44

[56] References Cited

U.S. PATENT DOCUMENTS

| | | | |
|---|---|---|---|
| 4,954,965 | 9/1990 | Johnson et al. | 340/825.5 |
| 5,185,737 | 2/1993 | Nasseki et al. | 370/85.8 |
| 5,193,090 | 3/1993 | Filipiak et al. | 370/94.1 |
| 5,390,181 | 2/1995 | Campbell | 370/85.2 |
| 5,402,422 | 3/1995 | Liu et al. | 370/85.5 |

OTHER PUBLICATIONS

"Distributed Queueing Random Access Protocols for a Broadcast Channel" Wenxin Xu, Dec., 1990.
"Extended DQRAP(XZDQRAP) a Cable TV Protocol Functioning as a Distributed Switch", Chien-Ting Wu & Graham Campbell, IEEE Community Networking, 1996, pp. 191–198.
"A distributed Queueing Random Access Protocol for a Broadcast Channel", Wenxin XU & Graham Campbell, Sigcomm, SF, Sep., '93, pp. 270–278.
"Multiple-Access Protocols: Fairness in Heterogeneous Systems", Mark J. Karol & Stuart C. Schwartz, Fellow, IEEE, IEEE Transcations on Communications, vol. 42, No., 6,. pp. 2276–2281.
"Multiple Access Protocols for Broadcast Channels", Mark J. Karol Department of Electrical Engineering, Information Sciences and Systems Laboratory, Technical report No. 50, Dec. 1985.

*Primary Examiner*—Benedict V. Safourek
*Assistant Examiner*—Ricky Q. Ngo
*Attorney, Agent, or Firm*—Darleen J. Stockley

[57] ABSTRACT

An efficient distributed queueing random access method and network system provide, in the medium access control layer in networks with broadcast channels, for conserving reservation bandwidth and concomitantly providing immediate transmission access, wherein, prior to receiving a first time slot, a plurality of reservation slot parameters are initialized by a user.

18 Claims, 6 Drawing Sheets

— PRIOR ART —

EFFICIENT DISTRIBUTED QUEUEING RANDOM ACCESS METHOD FOR THE MEDIUM ACCESS CONTROL LAYER IN NETWORKS WITH BROADCAST CHANNELS

FIELD OF THE INVENTION

This invention relates generally to multiple access methods in networks having broadcast communications channels, and more particularly, to multiple access methods in the medium access control layer of networks having broadcast channels.

BACKGROUND

A multiple access protocol, also called a random access protocol, is typically used to facilitate sharing of a broadcast communications channel in a network among many users. The multiple access protocol allows for simultaneous transmissions and resolves conflicts arising from these. Broadcast channels are provided on local and metropolitan area, radio, and satellite networks.

Figure 1:
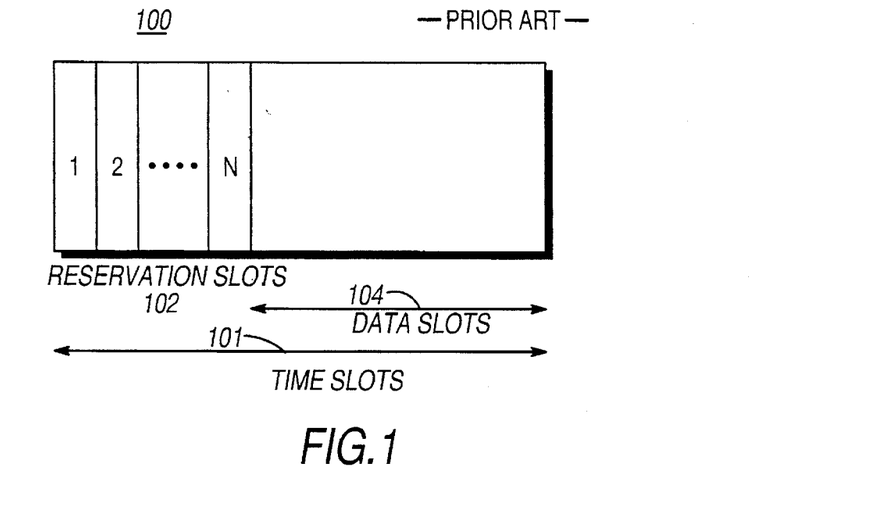
FIG. 1 is an illustration of a time slot as is known in the art.

A class of multiple access protocols uses minislots, or reservation slots, in a time slot to achieve a maximum throughput of 1.0. As shown in FIG. 1, numeral 100, in "slotted" environments, information is conveyed in transmission units of fixed length called a "time slot", and portions of time slots (101) are typically reserved for data transformation information such as reservations. These portions (1, . . . N (N a positive integer); 102) are generally called minislots or reservation slots. Since no information is carried over the minislots, it is desirable to use as few minislots as possible. Data is transmitted in the remainder of the time slot, which is called the data slot (104). In the known Distributed Queueing Random Access Protocol (DQRAP) technology, at least three minislots are required to obtain a successful reservation which achieves a maximum throughput of 1.0. The fewer the number of minislots that are required to obtain a successful reservation, the more efficient the use of the bandwidth. Reservations provision is accomplished in the medium access control layer.

Thus, there is a need for an efficient distributed queueing random access method for the medium access control layer in networks with broadcast channels that conserves reservation bandwidth and concomitantly provides immediate transmission access.

DETAILED DESCRIPTION OF A PREFERRED EMBODIMENT

The present invention requires only two minislots in a time slot to achieve a maximum throughput of 1.0 while preserving the desired immediate transmission access property. This frees the third minislot, which would typically be utilized for reservation, for other uses, or alternatively, allows the slot to utilize a larger data slot than would be possible where three minislots were utilized for reservation. Continued user operation is provided, even when feedback on reservation slots is not received in a next slot in a downstream direction. Thus, the present invention provides an efficient distributed queueing random access method for the medium access control layer in networks with broadcast channels that conserves reservation bandwidth and concomitantly provides immediate transmission access.

Figure 2:
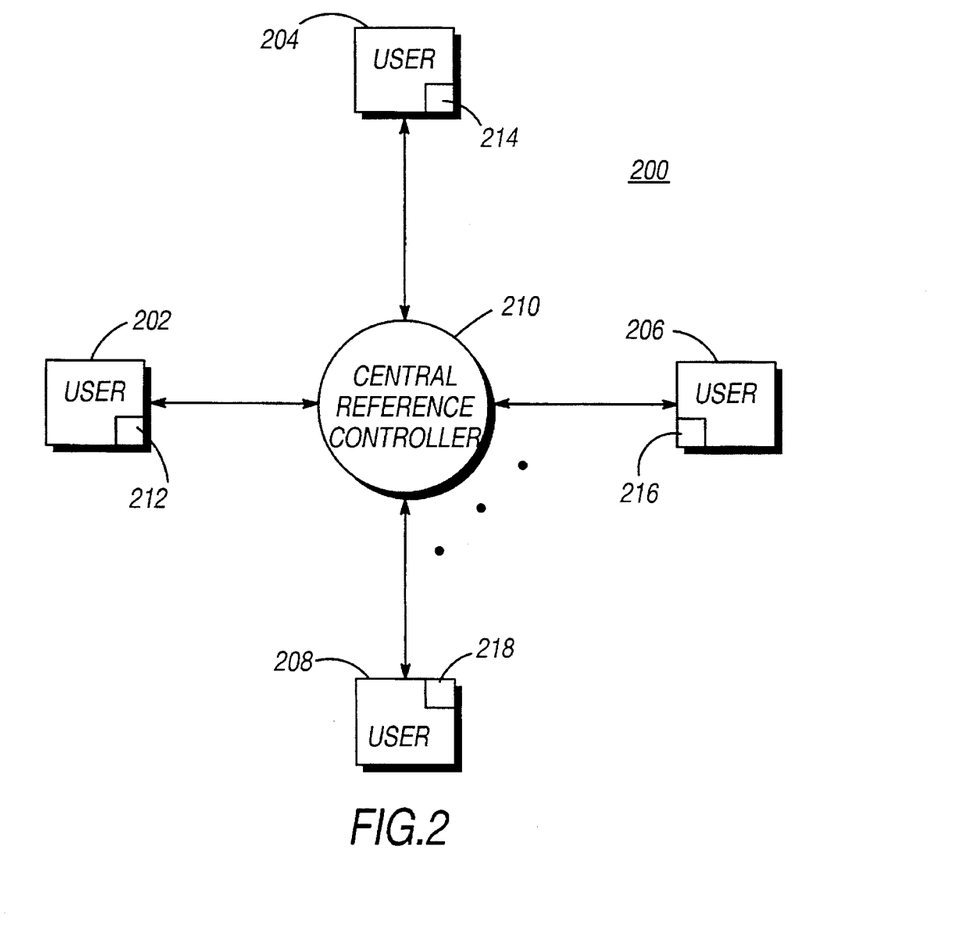
FIG. 2 is a diagrammatic representation of a star network with a central controller and a plurality of users that communicate in accordance with the present invention.

FIG. 2, numeral 200, is a diagrammatic representation of a star network with a central controller and a plurality of users that may utilize the present invention. A star network, i.e., a satellite or radio network, typically utilizes a multiple access protocol. In FIG. 2, the users (202, 204, 206, 208, . . . ) are geographically separated, and all users transmit information in packets to a central reference controller (210). When the central reference controller (210) receives the packets, it broadcasts the packets over one or more channels separate from the one(s) accessed by the users. Therefore, there is no conflict between packets transmitted upstream to the central reference controller (210) and packets broadcast downstream to the plurality of users (202, 204, 206, 208, . . . ). All users "hear" the downstream broadcast information and pick out the packets addressed to themselves. "Hear" typically means that a user's receiver is tuned to the same channel as the transmissions from the central reference controller (210), the user actually receives its own transmission and can determine whether the message in the transmission is garbled, e.g., signals received do not match signals transmitted and the user implies a collision from the incorrectly received signals. If there are two or more simultaneous transmissions in the upstream direction, packets involved in the conflict can be either all corrupted or at most one of them could be successfully received by the central reference controller (210). The present invention may be utilized by a star network system wherein each user includes a reservation counter scheduler (212, 214, 216, 218, . . . ) as described more fully below.

Figure 3:
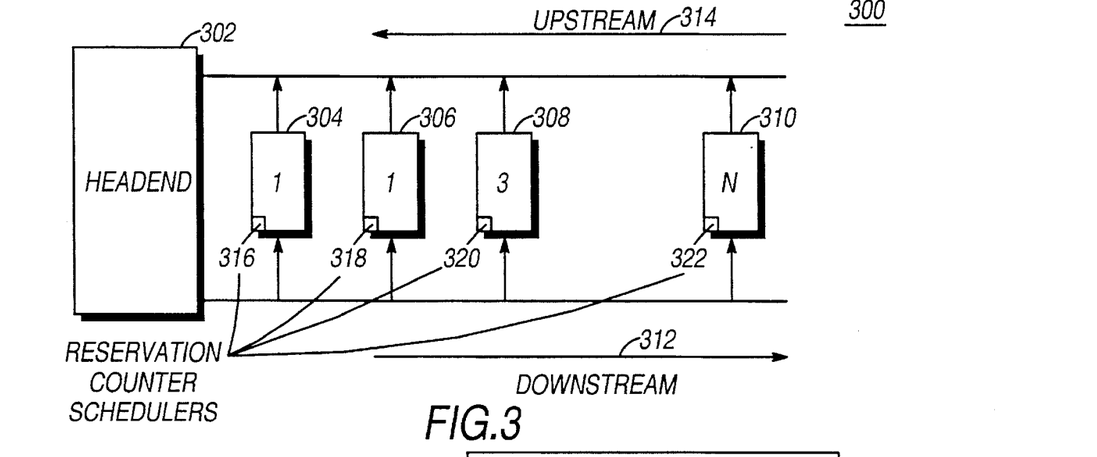
FIG. 3 is a diagrammatic representation of a cable television network system having a plurality of subscribers that communicate with a headend in accordance with the present invention.
Figure 4A:
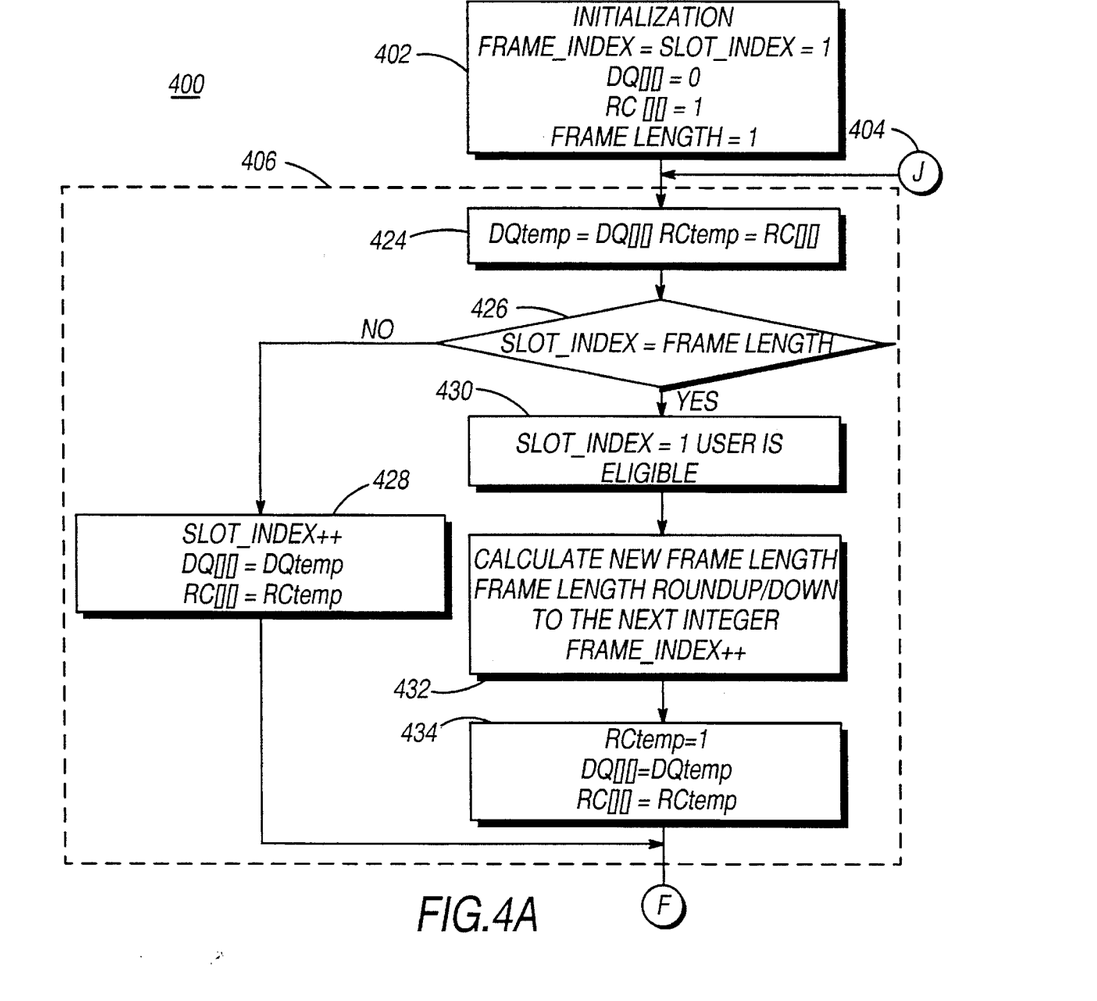
FIGS. 4A–4E represent a flow chart of one embodiment of steps in accordance with the present invention.
Figure 4B:
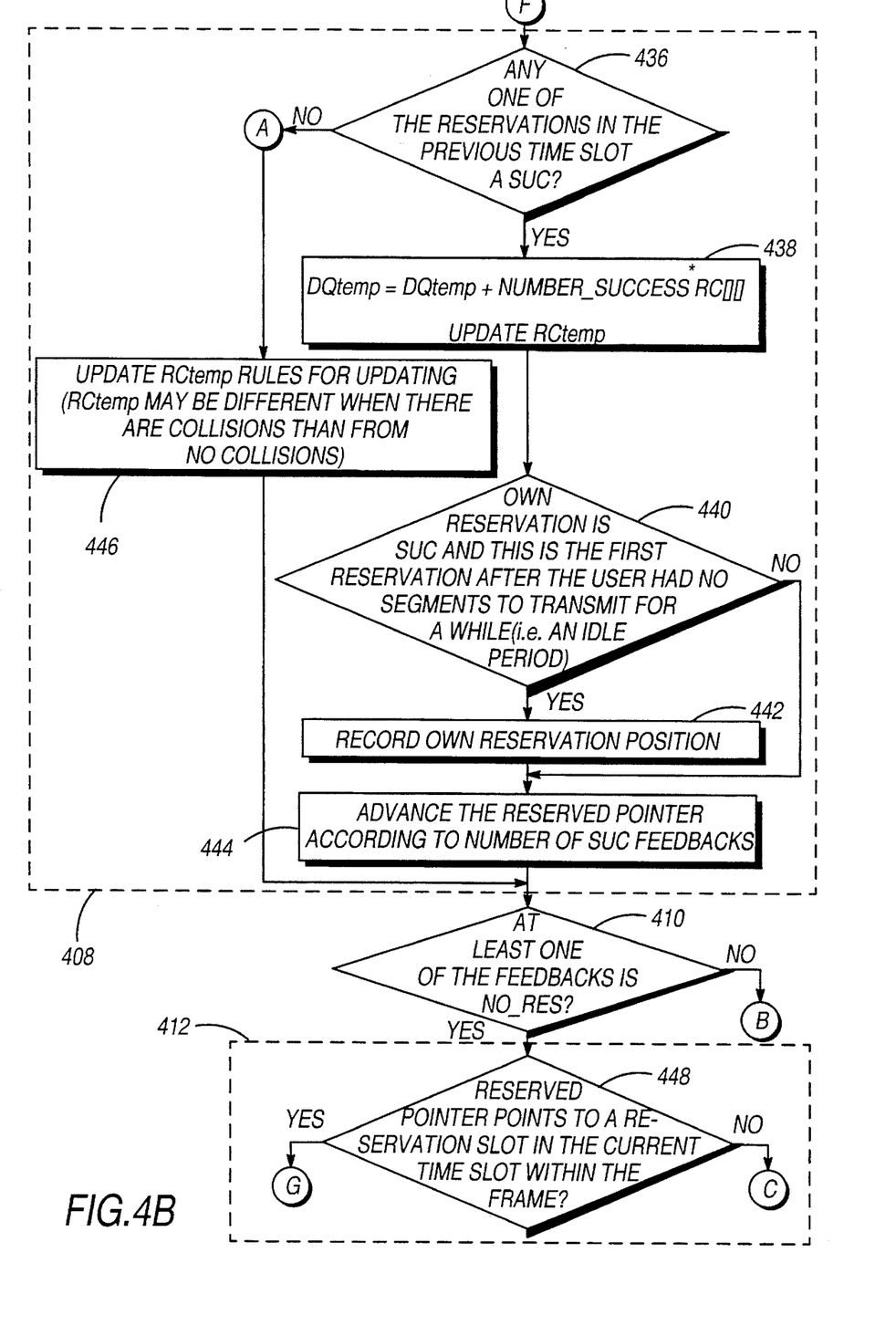
Figure 4C:
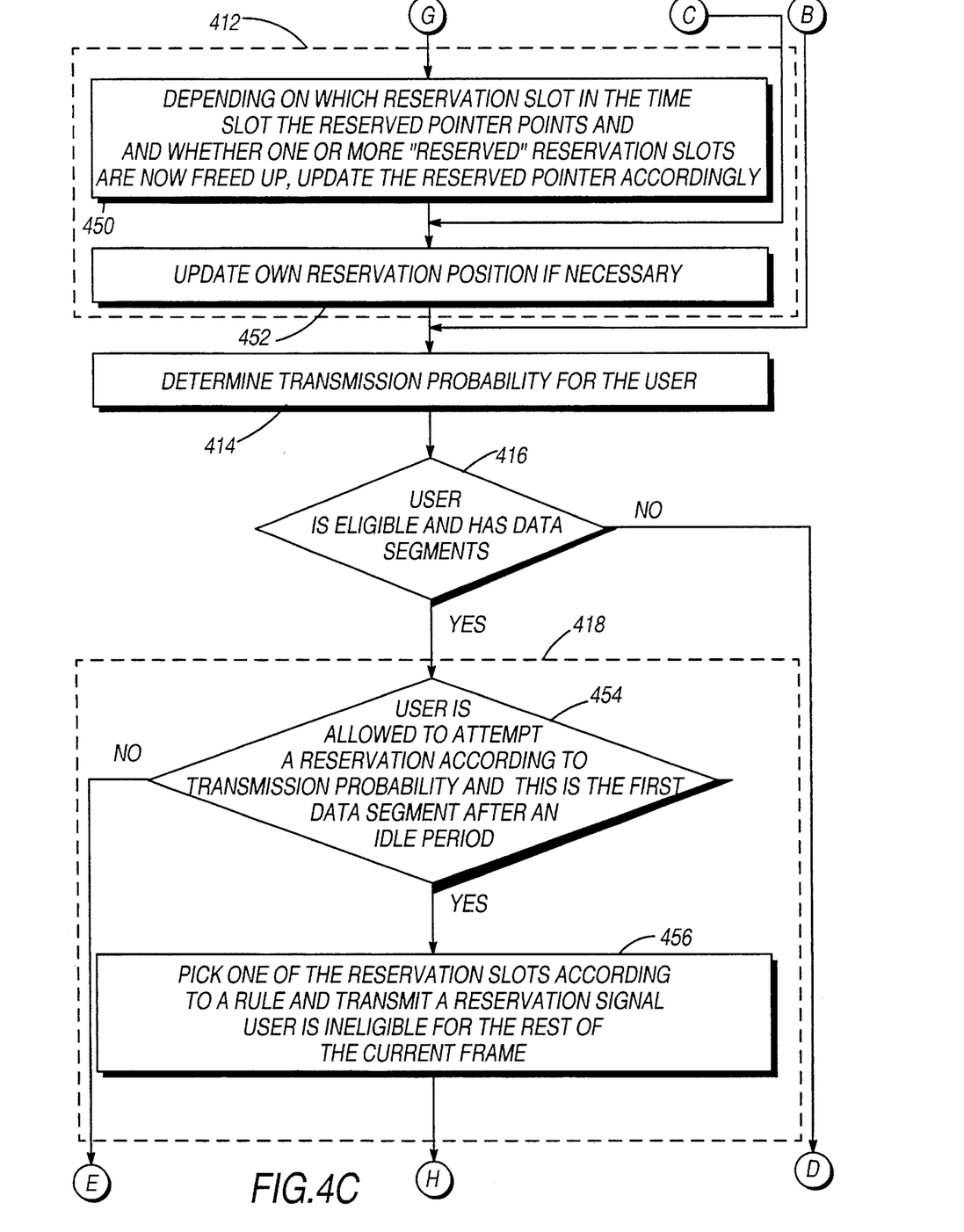
Figure 4D:
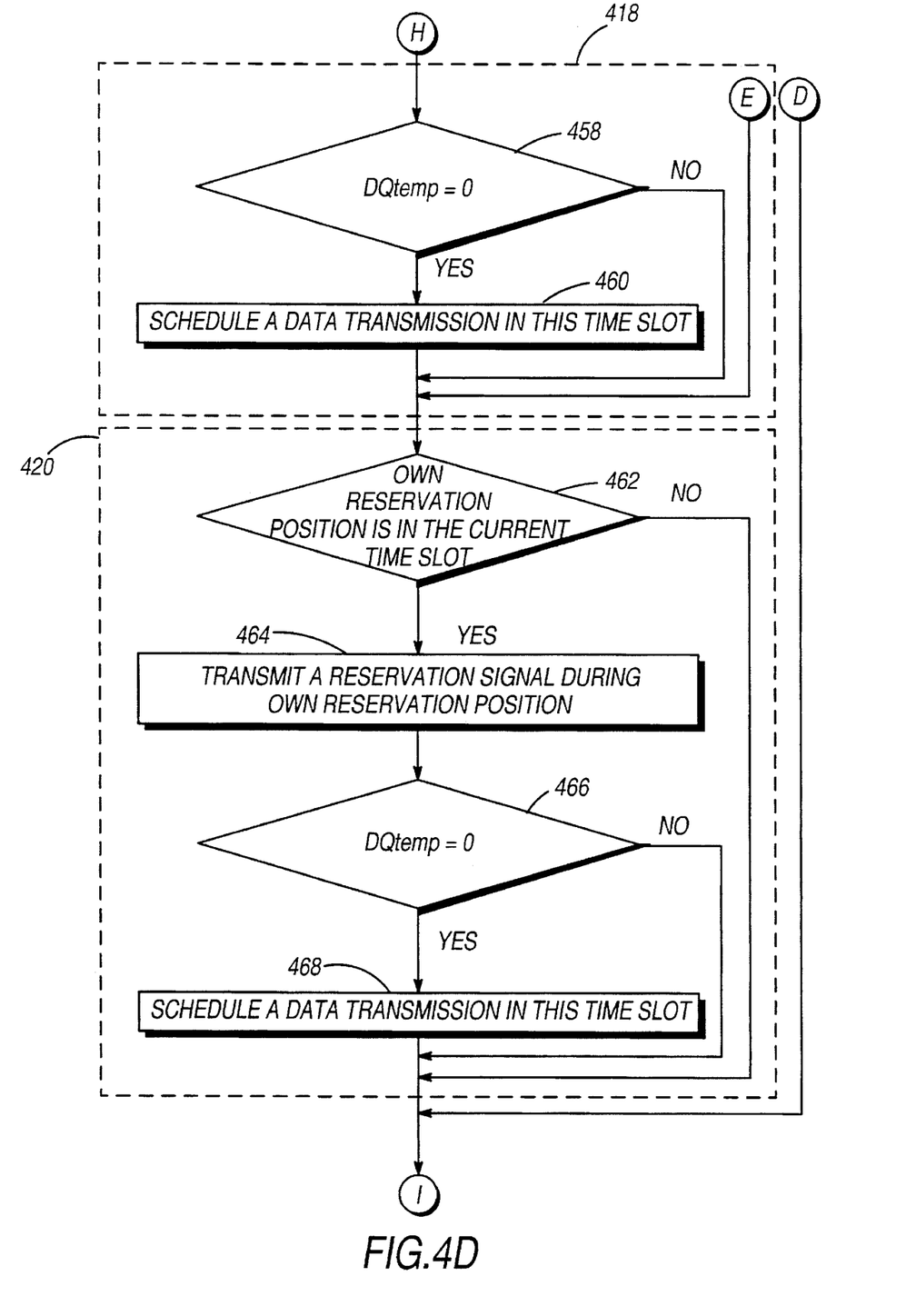
Figure 4E:
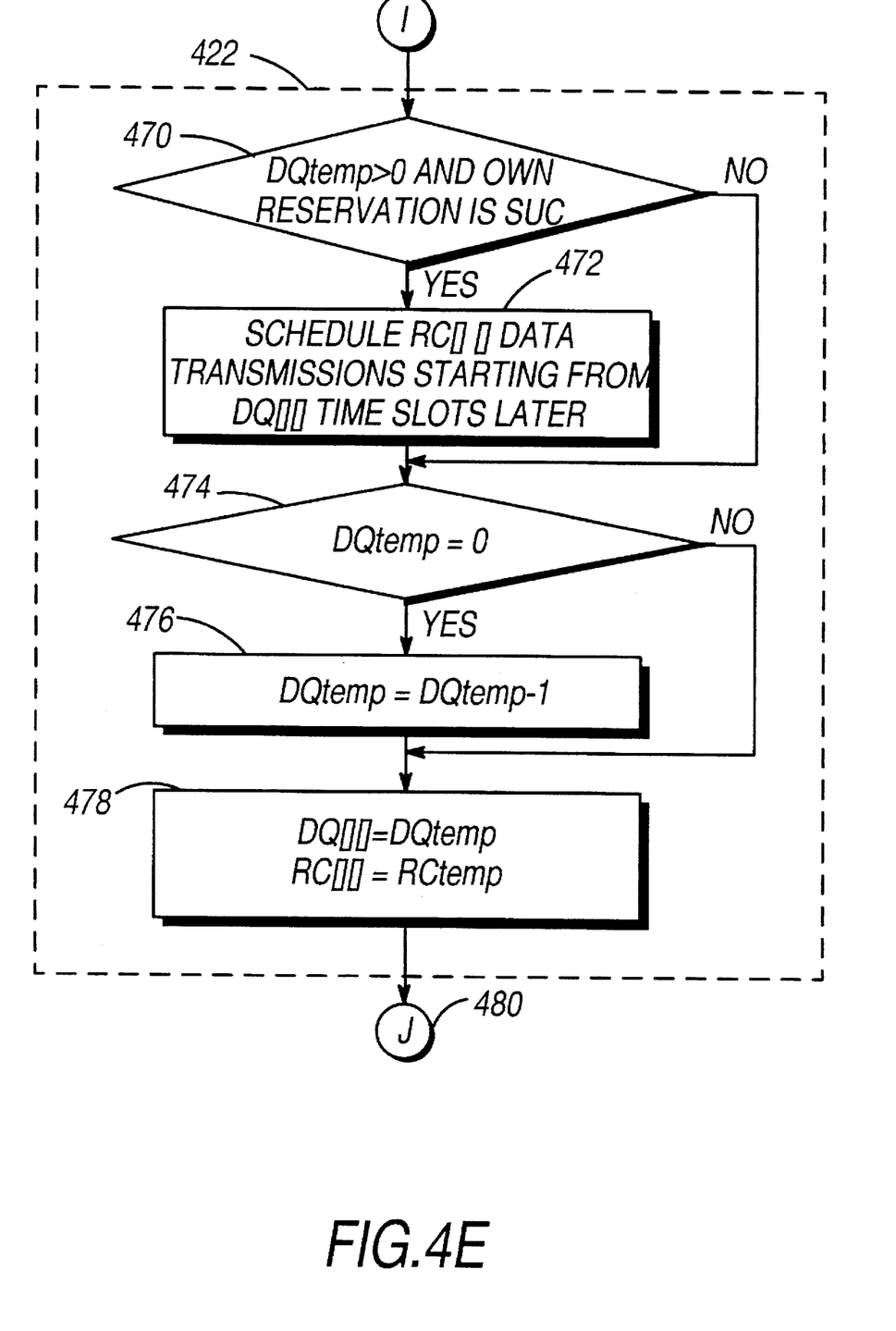

FIG. 3, numeral 300, illustrates a second example of a network topology where a broadcast channel is present, and transmission proceeds in accordance with the present invention. This is a cable television (CATV) environment, with users sending information to the headend upstream, and the headend then broadcasting downstream the information addressed to any one of the users wherein the present invention is utilized by a network system that has a broadcast channel.

The method of the present invention is applicable to an environment where there are a number of geographically distributed users. There is a reservation channel in addition to the transmission channel. The reservation channel may be multiplexed with the transmission channel either in time, frequency, or space. For example, where a time-multiplexed reservation channel is utilized, part of the time slot is utilized for two minislots that function as reservation slots, i.e., N=2 for a time slot as shown in FIG. 1, and a data slot. Messages of all types (e.g., file transfer, e-mail, etc.) are divided into fixed-length segments that each fit into a slot. This example is described further below where the present invention is implemented as shown in FIG. 3.

In general, the flow of slots in the upstream and downstream direction need not be synchronized. Also, there may be more than one slot of information that is flowing in either direction at a given time. Thus, the distance between the headend and the most distant user may be very large. The method of the present invention may be utilized in general cases without restriction.

By placing reservations, users (1,2, ... M, M a positive integer; 304, 306, 308, ... , 310) request access to a predetermined number of data slots. The determination of this number is set forth below. Users may choose any one of the reservation slots in the time slot to place their reservations. This selection may be random or deterministic and may be determined at the start of a frame and apply for the whole frame or may be determined at start-up and be valid anytime. Reservations are made in the upstream direction (314) and are received only by the headend (302). In the next time slot in the downstream direction (312), the headend transmits a feedback signal which indicates whether, in the previous reservation slots in the upstream direction, there was for each reservation slot (i) no reservation, (ii) a single reservation which was successfully received, or (iii) two or more reservations which is called a collision. In the case of collisions in the reservation slots, as in data slots, the reservations involved in the conflict can be either all corrupted or at most, one of them could be successfully received by the headend (302). The method of the present invention may be utilized in both cases. For practical purposes, the feedback signal is typically carried over a 2*N-bit field in the downstream time slot (2 bits of feedback per reservation slot, N is a number of minislots).

The feedback is available to all users before the start of the next time slot in the downstream direction, as shown in FIG. 4. Where there is a gap of more than one slot between a reservation and the reception of feedback, the method may be modified accordingly. The actual segment transmissions are scheduled in the same sequence that is utilized for the reservations (i.e., FIFO). This scheduling occurs in a distributed fashion via a distributed global queue DQ. The DQ does not physically exist, but a DQ count represents a set of all segments that have not been transmitted, but for which reservations have been made. Each user knows how many segments are waiting in front of its own segments in the distributed queue by obtaining feedback from the headend (302) and operating a reservation counter scheduler (316, 318, 320, ... 322). The reservation counter scheduler increases DQ by one for each successful reservation. It is decreased by one at every slot time unless it is equal to zero. Each user performs the increments and decrements on its own reservation counter scheduler according to the feedback.

Where the global queue DQ is empty (i.e., the reservation counter scheduler has the value zero), when the user transmits its reservation and sends its segment during the data slot of the same time slot, rather than wait to hear if its reservation was successful. Where no other user makes a reservation during that time slot, then the data segment transmission will be successful, and a one time slot delay will be avoided. When a collision occurs, then the segments involved in the collision are retransmitted at a later time.

A frame structure of consecutive time slots is imposed on the reservation channel. This frame structure is used to implement only the reservation process; hence, it is called a reservation frame. If a reservation is made during one frame, it is possible that the segment(s) will not be transmitted until a later reservation frame. Where desired, the length of the reservation frame may be changed according to traffic load, becoming longer as the load increases. Thus, the choice of the reservation frame length is flexible.

Each successful reservation not only reserves a data slot for the transmission of a data segment but also a reservation slot in the coming frames. The position of the "reserved" reservation slot is the next available unreserved reservation slot in the frame. All users keep a pointer (called reserved pointer) indicating the number of "reserved" reservation slots. When feedback is received for a successful reservation, the pointer is increased by one. The user who made the reservation also notes the position (e.g., slot x, reservation slot y in that slot) of the reservation slot. When a "reserved" reservation slot is detected as unused, the pointer is decreased by one. Also, all the users adjust their positions accordingly depending on whether they were ahead of or behind the unused reservation slot.

There is also a global reservation count RC that is maintained by the reservation counter scheduler wherein RC represents the number of data slots available on request by a reservation. All users compute the value of the RC count in a predetermined manner, and therefore know exactly how many data slots will be transmitted due to the current reservation. Thus, each user keeps an RC. The smallest possible value of this count is 1. The value of RC represents the number of "unused" reservation slots since the previous reservation of the current frame. This means RC is reset at the start of each reservation frame. A special case of the invention is to preset the rule that there will be one data slot transmission for every reservation, and thus the use of RC is unnecessary.

A user is eligible to transmit a reservation signal if it has not yet attempted to reserve any slots during the current reservation frame. After attempting a reservation, regardless of whether the reservation was successful or not, the user becomes ineligible. Eligible users transmit reservation signals with any desired probability. A global rule may be set for the users to follow or different subsets of users may follow different transmission probability rules. The choice of the transmission probability rules has implications on the performance of the protocol.

In the following, examples of four issues are described: specification of the global reservation count RC, selection of the transmission probabilities for eligible users, determination of frame lengths, and the structure of reservation signals.

Where a global reservation count RC is specified, the number of slots available for reservation (i.e., the number of data slots reserved by a single reservation slot) increases linearly until a reservation is successfully placed. In addition, the number of available slots may be reset to one at the start of each reservation frame and after each successful reservation.

Eligible users may transmit reservation signals with any probability. The flexibility in the selection of this probability is one of the attractive features of the method of the present invention. One possibility is: for a given reservation frame number i, and a time slot index j within that frame, and reservation frame length, $L_i$, the probability of transmission $p_{i,j}$ is given by the following for all stations.

$$p_{i,j} = \frac{1}{(L_i - j + 1)}$$

This formula states that at the start of the reservation frame (j =1), the probability of an eligible user to place a reservation is one divided by the frame length. At the end of the frame, the probability is 1.0. In other words, $p_{i,j}$ is an increasing function of the slot index within the frame.

The frame lengths are typically minimized since users can make only one reservation each frame. Otherwise, time slots may be wasted. At the same time, the frame length is typically increased as the number of users needing access to the channel increases. An example algorithm for determining a frame length at the start of each frame is based on the number of successful reservations and collisions during the current frame:

$$L_{i+1} = (2 * c_i + s_i)/N$$

where $c_i$ is the number of collisions, $s_i$ is the number of successes in the current frame, and N is the number of minislots. In general, $L_{i+1}$, the length of the next frame is not an integer and in such cases, it may be preselected to be rounded up or down to the next integer.

Reservation signals may be very short and contain only one bit of essential information: a reservation for the currently available amount of channel time (as indicated by the value of RC). However, reservation signals may also carry address information of the user making the reservation, the desired number of data slots, and the address information of the destination. All users know through the RC count that they keep that a successful reservation obtains the right to transmit a number of data slots equal to the RC count value.

Thus, the method of the present invention utilizes the fact that a successful reservation is not only a reservation for a data slot but also a reservation for a minislot in the upcoming frames. This is a fundamental improvement over known DQRAP type protocols. The invention allows the system to operate with two minislots (each only 1 bit long) and still have a maximum throughput of 1.0. The method of the present invention also provides a novel mechanism for keeping track of "reserved" reservation slots and their positions. Letting a successful reservation reserve not only a data slot but also a reservation slot in upcoming frames eliminates the probability of collisions while a user continues to have data segments and thus improves the performance.

Also, the method of the present invention provides immediate transmission access, i.e., allows user transmission when the feedback on a reservation slot is received in a slot that is received later than the next slot in the downstream direction.

Since known DQRAP has no flexibility for selecting rules for transmission probabilities or frame lengths, it cannot adjust very well to different traffic conditions. The present invention allows for adjustment for different traffic conditions through the selection of a number of parameters. The method of the present invention is particularly applicable in two-way communications over cable television communications, in particular as a medium access protocol, in wireless networks and satellite networks.

FIGS. 4A–4E, numeral 400, represents a flow chart of one embodiment of steps in accordance with the present invention. The present invention provides an efficient distributed queueing random access method for the medium access control layer in networks with broadcast channels, for conserving reservation bandwidth and concomitantly providing immediate transmission access, wherein, prior to receiving a first time slot, a plurality of reservation slot parameters are initialized (402) by a user of a plurality of users. The method includes the steps of: 1A) receiving (404) a time slot; 1B) determining (408) whether any reservation in a previous time slot was successful, and, where a reservation has been successful, executing a predetermined reservation updating procedure, and where a reservation has been unsuccessful, updating RCtemp (446); 1C) determining (410) whether at least one feedback indicates failure of reservation, and where feedbacks fail to indicate failure of reservation, proceeding to step 1E; 1D) performing (412), where at least one of the feedbacks indicates failure of reservation, predetermined reserved pointer adjustments; 1E) determining (414) transmission probability for the user; 1F) determining (416) whether the user is eligible to transmit, and where eligible, whether the user has a data segment for transmission; and where one of: the user is ineligible to transmit, and the user is eligible to transmit and the user fails to have data segments for transmission, proceeding to step 1H; 1G) executing (418), where user's reservation position is in the current time slot, a reservation-transmission procedure, and where the user's reservation position fails to be in the current time slot, proceeding to step 1H; and 1H) executing (420) a predetermined DQtemp procedure for reserving, where needed, a minislot in an upcoming frame.

Initialization of the plurality of parameters for the reservation slot may be selected to include: 2A) setting each of a frame index and a slot index equal to one; 2B) setting a first predetermined distributed global queue two dimensional array DQ[][] equal to zero, wherein said array has a slot index and a frame index; 2C) setting a second predetermined distributed global queue two dimensional array RC[][] equal to one, wherein said array has a slot index and a frame index; and 2D) setting a frame length equal to one.

After receiving the time slot, the method may include the step of adaptively adjusting, by the user, the frame length. Adaptively adjusting the frame length may be selected to include, after arrival of another time slot, the steps of: 4A) setting (424) a temporary value DQtemp for a distributed global queue equal to the first predetermined two-dimensional array DQ[][] and a temporary value RCtemp for a global reservation count equal to the second predetermined two-dimensional array RC[][] wherein both two dimensional arrays include a slot index and a frame index; 4B) determining (426) whether the slot index is equal to the frame length; 4C) where the slot index is unequal to the frame length, incrementing (428) the slot index and proceeding to step 1B; and 4D) where the slot index is equal to the frame length, setting (430) the slot index equal to one, calculating (432) a new frame length, rounding said frame length in accordance with a predetermined scheme, incrementing the frame index, setting (434) the temporary value RCtemp equal to one, setting the first predetermined two-dimensional array DQ[][] equal to the temporary value DQtemp and setting the second predetermined two-dimensional array RC[][] equal to the temporary value RCtemp.

Executing a predetermined reservation updating procedure, where a reservation in a previous time slot has been a success (408, 436) typically includes the steps of: 5A) setting (438) DQtemp=DQtemp+(number of success) *RC[][] and updating RCtemp; 5B) determining (440) whether the user's reservation has been successful and if the successful reservation is a first reservation after the user has been idle for a predetermined idle period, and where the user's reservation has been successful and the successful reservation is a first reservation after the predetermined idle period, recording (442) the user's reservation position; and where one of: the user's reservation has been successful, and the successful reservation fails to be a first reservation after the predetermined idle period, and the user's reservation has been unsuccessful, proceeding to step 5C; and 5C) advancing (442) a reserved pointer in accordance with a number of successful feedbacks.

Performing (412) predetermined reserved pointer adjustments typically includes the steps of: 6A) determining (448) whether a reserved pointer points to a reservation slot in a current time slot within the frame, and where the reserved pointer points to the reservation slot in the current time slot within the frame, updating (450) the reserved pointer in accordance with the reservation slot pointed to in the time slot and with whether more reserved reservation slots are made available; and where the reserved pointer fails to point to a reservation slot in the current time slot within the frame, proceeding to step 6B; and 6B) updating (452) the user's reservation position where needed.

Where the user is eligible to transmit, and the user has data segments for transmission, the method may further include the steps of: 7A) determining (454) whether the user is allowed to attempt a reservation according to transmission probability wherein transmission in accordance with the reservation follows a predetermined idle period; 7B) proceeding, where the user fails to be allowed to attempt a reservation, to step 1G; 7C) picking (456) a reservation slot according to a predetermined rule, transmitting a reservation signal, and becoming ineligible for a reservation for the rest of the current frame; 7D) determining (458) whether DQtemp=0, and scheduling (460), where DQtemp=0, a data transmission in the time slot, and proceeding, where DQtemp≠0, to determine whether own reservation portion is in the current time slot.

Generally, executing, where user's reservation position is in the current time slot (462), a reservation-transmission procedure includes the steps of: 8A) transmitting (464) a reservation signal during the user's reservation position; 8B) determining (466) whether DQtemp=0, and where DQtemp fails to equal 0, proceeding to step 1H; and where DQ=0, scheduling (468) a data transmission in the time slot.

Generally, the step of executing a predetermined DQtemp procedure for reserving, where needed, a minislot in an upcoming frame, includes the steps of: 9A) determining (470) whether DQtemp>0 and the user's reservation is successful, and where at least one of: the DQtemp≦0 and the user's reservation is unsuccessful, proceeding to step 9B, and where the DQtemp>0 and the user's reservation is successful, scheduling (472) RC[][] data transmissions starting from DQ[][] time slots later; 9B) determining (474) whether DQtemp=0, and where DQtemp≠0, proceeding to step 9C, and where DQtemp=0, setting (476) DQtemp= DQtemp−1; 9C) setting (478) DQI[][]=DQtemp and RC[][] =RCtemp, and proceeding to a next time slot (480).

The abbreviations used herein are:

DQ[][]: a two-dimensional array for the DQ with the indexes: the slot index and the frame index.

RC[][]: a two-dimensional array for the RC with the indexes: the slot index and the frame index.

DQtemp: a temporary variable to store the current value of DQ[][].

RCtemp: a temporary variable to store the current value of RC[][].

SUC: success.

NO_RES: no reservation.

number_success: number of successful reservations among N reservation slots in the previous slot.

slot_index++: slot_index=slot_index+1.

frame_index++: frame_index=frame_index+1.

We claim:

1. An efficient distributed queueing random access method for the medium access control layer in networks with broadcast channels, for conserving reservation bandwidth and concomitantly providing immediate transmission access, wherein, prior to receiving a first time slot, a plurality of reservation slot parameters are initialized by a user of a plurality of users, comprising the steps of:

1A) receiving a time slot;

1B) determining whether any reservation in a previous time slot was successful, and,
where a reservation has been successful, executing a predetermined reservation updating procedure to provide a user reservation position, and
where a reservation has been unsuccessful, updating reservation temporary value (RCtemp), 1C) determining whether at least one of the feedbacks indicates failure of reservation, and where feedbacks fail to indicate failure of reservation, proceeding to step 1E;

1D) performing, where at least one of the feedbacks indicates failure of reservation, predetermined reserved pointer adjustments;

1E) determining transmission probability for the user;

1F) determining whether the user is eligible to transmit, and where eligible, whether the user has a data segment for transmission; and
where one of:
the user is ineligible to transmit, and
the user is eligible to transmit and the user fails to have data segments for transmission,
proceeding to step 1H:

1G) executing, where user's reservation position is in the current time slot, a reservation-transmission procedure, and where the user's reservation position fails to be in the current time slot, proceeding to step 1H; and 1H) executing a predetermined distributed global queue temporary value (DQtemp) procedure for reserving, where needed, a minislot in an upcoming frame.

2. The method of claim 1 wherein initialization of the plurality of parameters for the reservation slot includes:

2A) setting each of a frame index and a slot index equal to one;

2B) setting a first predetermined distributed global queue two dimensional array DQ[][] equal to zero, wherein said array has a slot index and a frame index;

2C) setting a second predetermined distributed global queue two dimensional array RC[][] equal to one, wherein said array has a slot index and a frame index; and 2D) setting a frame length equal to one.

3. The method of claim 2 further including, after receiving the time slot, the step of adaptively adjusting, by the user, the frame length.

4. The method of claim 3 wherein the step of adaptively adjusting the frame length includes, after arrival of another time slot, the steps of:

4A) setting a temporary value DQtemp for a distributed global queue equal to the first predetermined two-dimensional array DQ[][] and a temporary value RCtemp for a global reservation count equal to the second predetermined two-dimensional array RC[][] wherein both two dimensional arrays include a slot index and a frame index;

4B) determining whether the slot index is equal to the frame length;

4C) where the slot index is unequal to the frame length, incrementing the slot index and proceeding to step 1B; and 4D) where the slot index is equal to the frame length, setting the slot index equal to one, calculating a new frame length, rounding said frame length in accordance with a predetermined scheme, incrementing the frame index, setting the temporary value RCtemp equal to one, setting the first predetermined two-dimensional array DQ[][] equal to the temporary value DQtemp and setting the second predetermined two-dimensional array RC[][] equal to the temporary value RCtemp.

5. The method of claim 1 wherein executing a predetermined reservation updating procedure includes the steps of:

5A) setting DQtemp=DQtemp+(number of success) *RC[][] and updating RCtemp;

5B) determining whether the user's reservation has been successful and if the successful reservation is a first reservation after the user has been idle for a predetermined idle period, and where the user's reservation has been successful and the successful reservation is a first reservation after the predetermined idle period, recording the user's reservation position; and where one of:
the user's reservation has been successful, and the successful reservation fails to be a first reservation after the predetermined idle period, and
the user's reservation has been unsuccessful, proceeding to step 5C; and 5C) advancing a reserved pointer in accordance with a number of successful feedbacks.

6. The method of claim 1 wherein performing predetermined reserved pointer adjustments includes the steps of:

6A) determining whether a reserved pointer points to a reservation slot in a current time slot within the frame, and where the reserved pointer points to the reservation slot in the current time slot within the frame, updating the reserved pointer in accordance with the reservation slot pointed to in the time slot and with whether more reserved reservation slots are made available; and where the reserved pointer fails to point to a reservation slot in the current time slot within the frame, proceeding to step 6B; and 6B) updating the user's reservation position where needed.

7. The method of claim 1 wherein, where the user is eligible to transmit, and the user has data segments for transmission, further including the steps of:

7A) determining whether the user is allowed to attempt a reservation according to transmission probability wherein transmission in accordance with the reservation follows a predetermined idle period;

7B) proceeding, where the user fails to be allowed to attempt a reservation, to step 1G;

7C) picking a reservation slot according to a predetermined rule, transmitting a reservation signal, and becoming ineligible for a reservation for the rest of the current frame;

7D) determining whether DQtemp=0, and
scheduling, where DQtemp=0, a data transmission in the time slot, and
proceeding, where DQtemp≠0, to step 7E.

8. The method of claim 1 wherein executing, where user's reservation position is in the current time slot, a reservation-transmission procedure includes the steps of:

8A) transmitting a reservation signal during the user's reservation position;

8B) determining whether DQtemp=0, and
where DQtemp fails to equal 0, proceeding to step 1H; and
where DQ=0, scheduling a data transmission in the time slot.

9. The method of claim 1 wherein the step of executing a predetermined DQtemp procedure for reserving, where needed, a minislot in an upcoming frame, includes the steps of:

9A) determining whether DQtemp>0 and the user's reservation is successful, and
where at least one of: the DQtemp≦0 and the user's reservation is unsuccessful, proceeding to step 9B, and
where the DQtemp>0 and the user's reservation is successful, scheduling RC[][] data transmissions starting from DQ[][] time slots later;

9B) determining whether DQtemp=0, and
where DQtemp≠0, proceeding to step 9C, and
where DQtemp=0, setting DQtemp=DQtemp−1;

9C) setting DQ[][]=DQtemp and RC[][]=RCtemp, and proceeding to a next time slot.

10. An network system for providing efficient distributed queueing random access for the medium access control layer in networks with broadcast channels, for conserving reservation bandwidth and concomitantly providing immediate transmission access, wherein, prior to receiving a first time slot, a plurality of reservation slot parameters are initialized by a user of a plurality of users, comprising:

A) a headend controller, responsive to a plurality of users, for controlling transmissions between the headend controller and the plurality of users; and B) the plurality of users, responsive to the headend controller, for receiving and transmitting on predetermined broadcast channels, wherein each user includes a reservation counter scheduler, wherein each reservation counter scheduler operates to conserve reservation bandwidth and concomitantly provide immediate transmission access by:

C) receiving a time slot;

D) determining whether any reservation in a previous time slot was successful, and,
where a reservation has been successful, executing a predetermined reservation updating procedure to provide a user reservation position, and
where a reservation has been unsuccessful, updating reservation temporary value (RCtemp), E) determining whether at least one of the feedbacks indicates failure of reservation, and where feedbacks fail to indicate failure of reservation, proceeding to step G;

F) performing, where at least one of the feedbacks indicates failure of reservation, predetermined reserved pointer adjustments;

G) determining transmission probability for the user;

H) determining whether the user is eligible to transmit, and where eligible, whether the user has a data segment for transmission; and
where one of:
the user is ineligible to transmit, and
the user is eligible to transmit and the user fails to have data segments for transmission,
proceeding to step 11H:

I) executing, where user's reservation position is in the current time slot, a reservation-transmission procedure, and where the user's reservation position fails to be in the current time slot, proceeding to step J; and J) executing a predetermined distributed global queue temporary value (DQtemp) procedure for reserving, where needed, a minislot in an upcoming frame.

11. The network system of claim 10 wherein initialization of the plurality of parameters for the reservation slot includes:

12A) setting each of a frame index and a slot index equal to one;

12B) setting a first predetermined distributed global queue two dimensional array DQ[][] equal to zero, wherein said array has a slot index and a frame index;

12C) setting a second predetermined distributed global queue two dimensional array RC[][] equal to one, wherein said array has a slot index and a frame index; and 12D) setting a frame length equal to one.

12. The network system of claim 11 further including, after receiving the time slot, the step of adaptively adjusting, by the user, the frame length.

13. The network system of claim 12 wherein the step of adaptively adjusting the frame length includes, after arrival of another time slot, the steps of:

14A) setting a temporary value DQtemp for a distributed global queue equal to the first predetermined two-dimensional array DQ[][] and a temporary value RCtemp for a global reservation count equal to the second predetermined two-dimensional array RC[][] wherein both two dimensional arrays include a slot index and a frame index;

14B) determining whether the slot index is equal to the frame length;

14C) where the slot index is unequal to the frame length, incrementing the slot index and proceeding to step 11B; and 14D) where the slot index is equal to the frame length, setting the slot index equal to one, calculating a new frame length, rounding said frame length in accordance with a predetermined scheme, incrementing the frame index, setting the temporary value RCtemp equal to one, setting the first predetermined two-dimensional array DQ[][] equal to the temporary value DQtemp and setting the second predetermined two-dimensional array RC[][] equal to the temporary value RCtemp.

14. The network system of claim 10 wherein executing a predetermined reservation updating procedure includes the steps of:

15A) setting DQtemp=DQtemp+(number of success) *RC[][] and updating RCtemp;

5B) determining whether the user's reservation has been successful and if the successful reservation is a first reservation after the user has been idle for a predetermined idle period, and where the user's reservation has been successful and the successful reservation is a first reservation after the predetermined idle period, recording the user's reservation position; and where one of:

the user's reservation has been successful, and the successful reservation fails to be a first reservation after the predetermined idle period, and the user's reservation has been unsuccessful, proceeding to step 15C; and 15C) advancing a reserved pointer in accordance with a number of successful feedbacks.

15. The network system of claim 10 wherein performing predetermined reserved pointer adjustments includes the steps of:

16A) determining whether a reserved pointer points to a reservation slot in a current time slot within the frame, and where the reserved pointer points to the reservation slot in the current time slot within the frame, updating the reserved pointer in accordance with the reservation slot pointed to in the time slot and with whether more reserved reservation slots are made available; and where the reserved pointer fails to point to a reservation slot in the current time slot within the frame, proceeding to step 6B; and 16B) updating the user's reservation position where needed.

16. The network system of claim 10 wherein, where the user is eligible to transmit, and the user has data segments for transmission, further including the steps of:

17A) determining whether the user is allowed to attempt a reservation according to transmission probability wherein transmission in accordance with the reservation follows a predetermined idle period;

17B) proceeding, where the user fails to be allowed to attempt a reservation, to step 11G;

17C) picking a reservation slot according to a predetermined rule, transmitting a reservation signal, and becoming ineligible for a reservation for the rest of the current frame;

17D) determining whether DQtemp=0, and scheduling, where DQtemp=0, a data transmission in the time slot, and proceeding, where DQtemp≠0, to setting DQ[][]= DQtemp and RC[][]=RCtemp, and proceeding to a next time slot.

17. The network system of claim 10 wherein executing, where user's reservation position is in the current time slot, a reservation-transmission procedure includes the steps of:

18A) transmitting a reservation signal during the user's reservation position;

18B) determining whether DQtemp=0, and where DQtemp fails to equal 0, proceeding to step 11H; and where DQ=0, scheduling a data transmission in the time slot.

18. The network system of claim 10 wherein the step of executing a predetermined DQtemp procedure for reserving, where needed, a minislot in an upcoming frame, includes the steps of:

19A) determining whether DQtemp>0 and the user's reservation is successful, and where at least one of: the DQtemp≤0 and the user's reservation is unsuccessful, proceeding to step 19B, and where the DQtemp>0 and the user's reservation is successful, scheduling RC[][] data transmissions starting from DQ[][] time slots later;

19B) determining whether DQtemp=0, and where DQtemp≠0, proceeding to step 9C, and where DQtemp=0, setting DQtemp=DQtemp−1;

19C) setting DQ[][]=DQtemp and RC[][]=RCtemp, and proceeding to a next time slot.

* * * * *